(12) United States Patent  
Koch et al.

(10) Patent No.: US 6,913,048 B2  
(45) Date of Patent: Jul. 5, 2005

(54) APPARATUS FOR COUPLING TWO STORAGE AND/OR TRANSPORT UNITS TO A SAFETY DEVICE

(75) Inventors: Martin Koch, Neuenburg (DE); Bernd Elsässer, Ballrechten-Dottingen (DE)

(73) Assignee: GEA Buck Valve GmbH, Mullheim (DE)

( * ) Notice: Subject to any disclaimer, the term of this patent is extended or adjusted under 35 U.S.C. 154(b) by 13 days.

(21) Appl. No.: 10/344,979

(22) PCT Filed: Mar. 6, 2001

(86) PCT No.: PCT/DE01/00854
§ 371 (c)(1),
(2), (4) Date: Jun. 12, 2003

(87) PCT Pub. No.: WO02/18248
PCT Pub. Date: Mar. 7, 2002

(65) Prior Publication Data
US 2004/0099335 A1 May 27, 2004

(30) Foreign Application Priority Data
Aug. 28, 2000 (DE) ...................................... 200 14 871 U

(51) Int. Cl.$^7$ ............................................... B65G 69/18
(52) U.S. Cl. .................. 141/346; 137/240; 137/614.06; 141/383
(58) Field of Search ................................ 141/346, 383, 141/348–354, 384, 386; 137/614.01, 614.06, 614.11, 240

(56) References Cited

U.S. PATENT DOCUMENTS

| 5,540,266 A | 7/1996 | Grau et al. .................. 141/383 |
| 5,690,152 A | 11/1997 | Koch et al. .................. 141/346 |
| 6,412,518 B1 * | 7/2002 | Pieri ...................... 137/614.01 |

FOREIGN PATENT DOCUMENTS

| DE | 43 42 962 | 2/1995 |
| DE | 44 15 488 | 11/1995 |
| DE | 195 20 409 | 10/1996 |
| DE | 200 14 871 | 2/2001 |
| DE | 299 15 973 | 3/2001 |
| EP | 0 554 096 | 4/1993 |
| GB | 888541 | 1/1962 |

* cited by examiner

Primary Examiner—J. Casimer Jacyna
(74) Attorney, Agent, or Firm—Schiff Hardin LLP

(57) ABSTRACT

A device couples two storage and/or transport units with a security device. By alternately using a single actuating device, the security device and a pivoting device react in such a way that connecting branches of the units which are coupled are placed in a lock position by the security device and are firmly locked with respect to each other such that it is not possible to separate them. Closing valves in the connecting branches insure that the connecting branches are sealed from each other. By subsequently rotating the drive shaft, it is possible to open the closing valves using the pivoting device in order to enable a transfer process to occur. By rotating the drive shaft back, the closing valves are re-closed. Also by rotating the drive shaft, the connecting branches can be separated from each other.

15 Claims, 2 Drawing Sheets

APPARATUS FOR COUPLING TWO STORAGE AND/OR TRANSPORT UNITS TO A SAFETY DEVICE

BACKGROUND OF THE INVENTION

In an apparatus for coupling two storage and/or transport units, for instance in the forms of vessels, containers, tubes and/or the like, for the purpose of a transfer of a product from a first storage and/or transport unit to a second storage and/or transport unit, the first unit has a first closing flap in a first pipe socket at a first end and in an active connection with at least one shaft. The second unit has a second closing flap in a second pipe socket at a second end. With a swivelling device and a safety device, the closing flaps are movable from a closed position wherein the first closing flap tightly closes the first storage and/or transport unit off from the atmosphere at the first end. The second closing flap tightly closes the second storage and/or transport unit off from the atmosphere at the second end and the two closing flaps and/or the two pipe sockets are movable relative to one another into a locked position. The two closing flaps and/or the two pipe sockets are firmly connected to one another. In an open position the closing flaps and/or pipe sockets are firmly connected to one another. At least one flow-through opening for the product is open from the first storage and/or transport unit into the second storage and/or transport unit, and are movable from the open position into the locked position as well as into the closed position.

Such an apparatus is disclosed, for example, by GB Letters Patent 888,541. Given the known device, the pipe sockets are rotatable relative to one another, whereby a bayonet closure is locked or unlocked by turning the pipe sockets relative to one another and, at the same time, the closing flaps are forced from the closed position into the open position or from the open position into the closed position, so that the locking position coincides with the open position. Such a lock is particularly disadvantageous in that the closing flaps can unintentionally detach from one another while changing from the closed position into the open position or vice versa, also due to the employment of only one bayonet closure. Moreover a cleaning before and/or after a product transfer or a refilling event in the open position is not possible in a locked position in order to avoid contamination of the atmosphere and/or the product to be refilled.

Further, DE 195 20 409 C1 discloses an apparatus for coupling containers to a blower and extraction device that enables a cleaning of the closing flaps before and/or after a refilling event to be accomplished with the apparatus. A seal is thereby utilized that, given a spacing of the closing flaps of, preferably, less than 15 mm, disadvantageously seals the space situated between the closing flaps, i.e. the impact chamber, off from the outside, with the exception of the regions of the bearing shells thereof. A sealing of the impact chamber from at least a part of the closing flaps is disclosed by DE 299 15 973. An interspace between the closing flaps that is sealed relative to the impact chamber thereby assures that dust that is potentially stirred up due to a scrubbing cannot proceed onto the end face regions, and the extraction cross-section for a cleaning gas, protective atmosphere and/or the like together with particles to be removed is made smaller at the same time, so that the volume stream for the extraction is increased and a greater extraction power is created.

U.S. Pat. No. 5,690,152 also discloses an apparatus for coupling two containers for bulk goods comprising two pipe sockets as well as a safety device. Each pipe socket comprises a throttle flap seated in an essentially circular seal, whereby one throttle flap can be actively rotated via a swivel drive and, when seated against the second, passive throttle flap, entrains the latter. The safety device comprises at least one pin that is radially movable with reference to the seal and that deforms the seal surrounding the throttle flap in the closed throttle flap position such that an opening of the at least one throttle flap is prevented. Moreover, the apparatus can be equipped with a closure device that is activated when the two containers are docked, so that a release of the pipe sockets from one another during a pouring event is avoided. The safety device and the closure device should thereby be simultaneously activated by an operator via a lever but separately from the swivel drive.

SUMMARY OF THE INVENTION

It is therefore an object of the present invention to improve an apparatus of the aforementioned type such that the disadvantages of the Prior Art are overcome, particularly such that a structurally simpler and more dependable closing of the closing flaps and/or pipe sockets relative to one another is present before opening the flow-through openings for a refilling event as well as after closing the flow-through openings. A cleaning, particularly in the region of the bearing of the closing flaps, should also be improved.

This object is achieved by an actuation device via which the safety device can be driven for changing from the closed position into a locked position wherein the two storage and/or transport units are sealed relative to one another and the two closing flaps and/or the two pipe sockets are firmly joined to one another. Then the swivel device can be driven for moving into and subsequently moving out of the open position and, subsequently, the safety device can be driven for changing from the locked position into the closed position.

DESCRIPTION OF THE PREFERRED EMBODIMENT

Figure 1:
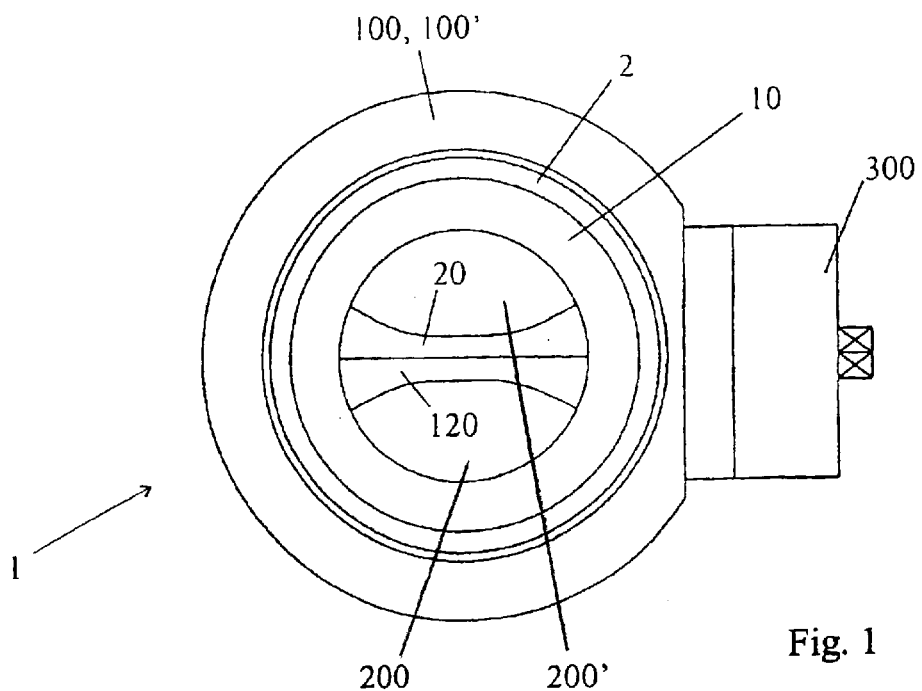
FIG. 1 is a cross-sectional view through an apparatus wherein the closing flaps are in their open position.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

In the disclosed system and method, it is thereby preferred that the actuation device comprises a gear device with a drive shaft and at least two output shafts, whereby the two output shafts can be addressed by the drive shaft in alternating fashion.

The safety device has an active connection with, on the one hand, the first output shaft and, on the other hand, with the two pipe sockets. The safety device preferably comprises a connection element between the first pipe socket and the second pipe socket that can be turned around a first axis for locking the two pipe sockets relative to one another or for unlocking them, particularly via at least one bayonet closure.

The swivel device has an active connection with, on the one hand, the second output shaft and, on the other hand, with at least one of the two closing flaps for turning the closing flaps around a second axis, whereby the swivel device preferably comprises the two semi-axes whereof the first semi-axis is firmly connected to the first closing flap and the second semi-axis is firmly connected to the second closing flap.

It is preferred that the closing flaps are spaced from one another, at least in regions, between the closed position and the locked position and/or between the open position and the locked position with closing flaps and/or pipe sockets that are at least partly firmly connected to one another in order to limit a cleaning space in a cleaning position that is closed both relative to the atmosphere as well as to the product.

The connecting element comprises at least one projection or at least one recess and each projection or each recess of the connecting element is in firm engagement with a recess or a projection of the first pipe socket and/or of the second pipe socket in the locked position. Thus each projection or each recess of the connecting element or of the pipe socket or sockets preferably describes or describe an angle relative to the first axis, at least in regions, in order—by turning the connecting element around the first axis—to move the closing flaps away from one another, particularly between the open position and the locked position or toward one another, particularly between the closed position and the locked position.

It can also be advantageously provided that the first closing flap comprises a first end face with at least one depression and/or elevation, the second closing flap comprises a second end face complementary with the first end face, and the two end faces lie tightly against one another, at least in the open position. Thus in the cleaning position, the end faces are preferably sealed relative to one another in the region of the at least one depression and/or elevation, and the cleaning space is essentially annular.

The first closing flap comprises at least one first recess at its side lying opposite the first end face and/or the second closing flap comprises at least one second recess at its side lying opposite the second end face for enlarging the flow-through opening or flow-through openings in the open position. The first recess and/or the second recess is or are preferably essentially spherical segment-shaped.

In the open position, the first closing flap is at least partially in engagement with the second pipe socket and/or the second closing flap is at least partially in engagement with the first pipe socket.

The first closing flap and/or the second closing flap comprises or comprise at least one partially annular projection, preferably two partially annular projections lying opposite one another, concentrically arranged relative to the second axis for engagement into at least one partially annular recess in the first pipe socket and/or in the second pipe socket.

Alternatively, the first closing flap and/or the second closing flap comprises or comprise at least one partially annular channel, preferably two partially annular channels lying opposite one another, concentrically arranged relative to the second axis for engagement into at least one partially annular recess in the first pipe socket and/or in the second pipe socket.

It can also be provided that the second axis resides essentially perpendicular to the first axis.

The first closing flap is a component part of a passive valve and the second closing flap is a component part of an active valve. The second semi-axis is preferably firmly connected to the second output shaft.

A cleaning device is provided via which a fluid cleaning agent can be introduced into and removed from the closed cleaning space in the cleaning position.

A surprising perception is that, given utilization of a single actuation device, a safety device and a swiveling device can be addressed in alternating fashion, i.e. not at the same time, so that, after coupling two containers, pipe sockets of the containers are brought into a locked position and, thus, are firmly locked to one another, so that a parting of the pipe sockets is impossible in the cleaning position. Closing flaps in the pipe sockets insure a tight closure of the of the pipe sockets, and, by subsequently turning the drive shaft from 90° to 180°, the closing flaps are opened via the swiveling device in order to enable a refilling event. By turning the drive shaft back from 180° to 90°, the closing flaps are returned into their closed position, and by turning from 90° to 0°, the pipe sockets are in turn separated from one another. In a partially locked condition of the pipe sockets around the locked position, a region between the pipe sockets and a part of the end faces of the closing flaps, what is referred to as the impact chamber, is implemented for the first time as a cleaning space closed on all sides and that is sealed relative to the outside atmosphere as well as relative to the product space. This is potentially protected against being unintentionally broken open due to the locking of the pipe sockets, and can be advantageously cleaned both before as well as after a refilling event, even with a cleaning fluid, without risk of contamination, whether of the product to be refilled and/or of the atmosphere.

As can be derived from FIG. 1, an apparatus 1 comprises a first pipe socket 10 at a first container (not shown) that, as soon as the first container is coupled to a second container (not shown), is seated in a second, bipartite pipe socket 100, 100' of the second container upon interposition of a connecting element or connecting ring 2. Two valves 20, 120 are in turn seated in the two pipe sockets, 10, 100, 100', whereby the first valve 20 can be passive and the second valve 120 can be active, so that only the active valve 120 can be actively actuated upon utilization of a gear device 300 for opening or closing flow-through openings 200, 200' from the first container to the second container.

Figure 2:
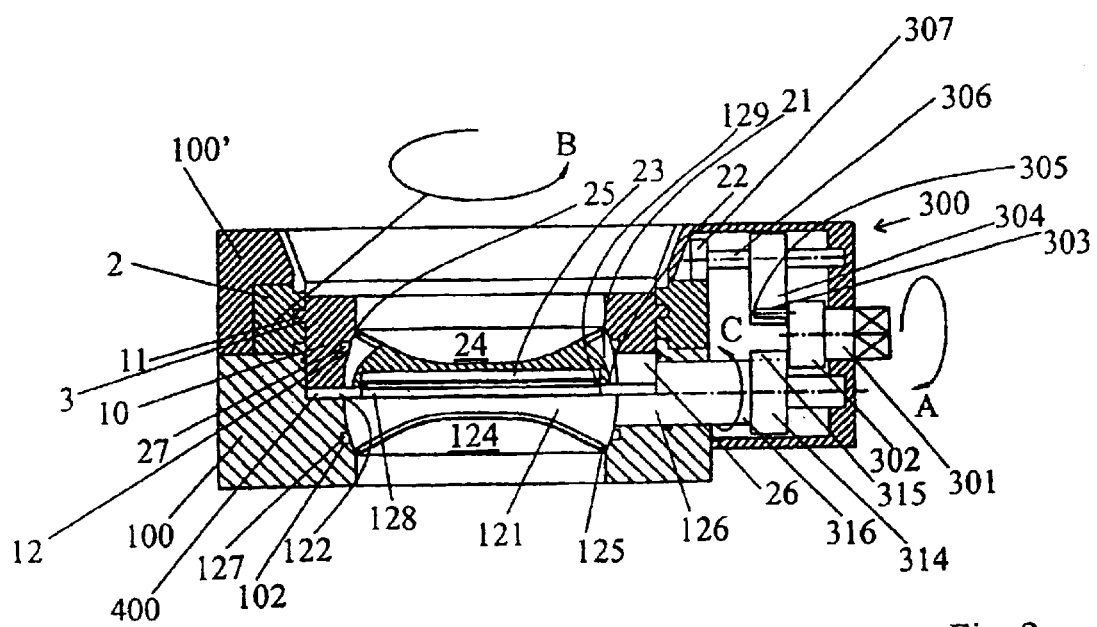
FIG. 2 is a longitudinal sectional view of the apparatus shown in FIG. 1 wherein the closing flaps are in their cleaning position.
Figure 4:
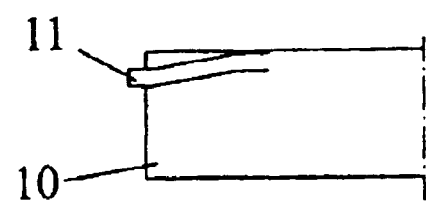
FIG. 4 is a partial view of a connecting ring that is employable in an apparatus according to FIGS. 1 and 2.

In the cleaning position shown in FIG. 2, the second pipe socket 100, 100' embraces the connecting ring 2 that in turns attaches the first pipe socket 10, so that the pipe sockets 10, 100, 100' cannot move relative to one another. For this purpose, the connecting ring 2 is provided with two recesses 3 that lie opposite one another and extend along the inside circumference and into which a respective projection 11 of the first pipe socket 10 can engage, whereby each projection 11 extends at least partially in curved form along the outside circumference of the first pipe socket 10, as shown in FIG. 4.

The first pipe socket 10 also comprises two recesses 12 lying opposite one another into which the passive valve 20 engages in the locked position according to FIG. 2. The passive valve 20 in turn comprises a flap 21 having an end face 22 in which a depression 23 is formed and a spherical segment-shaped recess 24 at the side lying opposite the end face 22. Further, the passive valve 20 is sealed relative to the first pipe socket 10 by means of a closing flap seal 25 and is firmly connected to a first shaft segment comprising a first semi-axis 26. Finally, the passive valve 20 also comprises two projections 27 for engagement into the recesses 12.

In an analogous way, the active valve 120 is seated in the second pipe socket 100 by engagement into two recesses 102 lying opposite one another. The active valve 120 in turn comprises a flap 121 with an end face 122, from which a projection 127 is salient, and a spherical segment-shaped recess 124 at the side lying opposite the end face 122. The active valve 120 is also sealed relative to the second pipe socket 100 upon utilization of a closing flap seal 125. The closing flap 121 of the active valve 120 is firmly connected with a second shaft segment comprising a second semi-axis 126. Further, projections 127 are offered for engagement into the recesses 102 according to FIG. 2 of the active valve 120. Moreover, a further closing flap seal 129 is provided between the two closing flaps 21, 121 in the region of the depression 23 into which the elevation 128 according to FIG. 2 partly engages.

Figure 3:
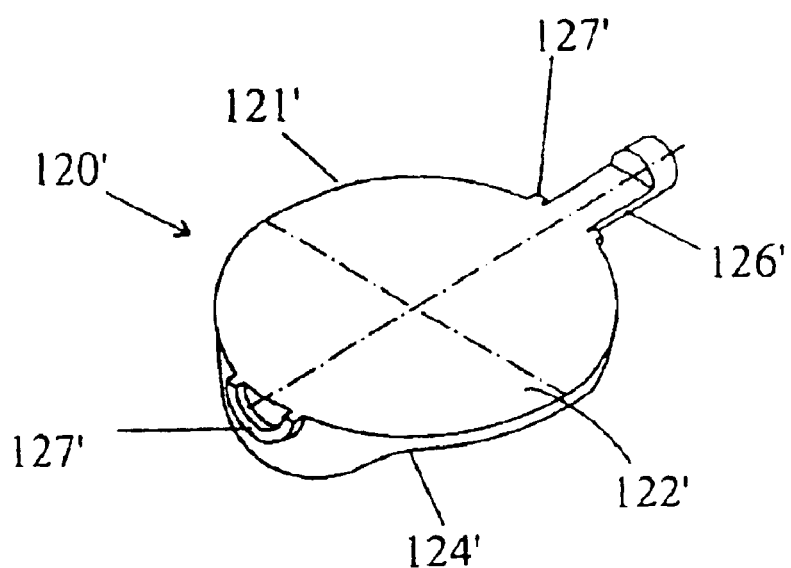
FIG. 3 is a perspective view of a closing flap that is employable with an apparatus according to FIGS. 1 and 2.

An alternative active valve 120' is shown in FIG. 3. The active valve 120' thereby comprises a closing flap 121' with a planar end face 122' and a spherical segment-shaped recess 124' at its side lying opposite the end face 122'. Further, the closing flap 121' is provided with a semi-axis 126' at one side, two semicircular projections 127 proceeding concentrically to the longitudinal axis thereof.

According to FIG. 2, the gear device 300 comprises a drive shaft 301 with a disk 302 and a plug 303 that attaches in alternating fashion at a disk 304 with a recess 305 for driving a first output shaft 306 or at a disk 314 with a recess 315 for driving a second output shaft 316. The first output shaft 306 is also connected to a disk 307 that attaches at the connecting ring 2 for turning the latter, whereas the second output shaft 316 merges into the second semi-axis 126 for actuating the active valve 120.

In the cleaning position shown in FIG. 2, finally, a cleaning space 400 closed at all sides is provided between the pipe sockets 10, 100 as well as the closing flaps 21, 121.

The apparatus whose structure has just been described with reference to the Figures works, for example, in the following way.

First, the first pipe socket 10 together with the passive valve 20 is inserted into the second pipe socket 100, 100' as well as the connecting ring 2 until the first pipe socket 10 comes to lie on the second pipe socket 100 in the closed position.

When the drive shaft 301 is then turned in the direction of the arrow A in FIG. 2, then the plug 303 engages into the recess 305 in the disk 304 in order to transmit the rotary motion onto the first output shaft 306. Upon utilization of the disk 307, the first output shaft 306 then compels a rotation of the connecting ring 2 in the direction of the arrow B in FIG. 2, so that the projections 11 of the first pipe socket 10 engage into the corresponding recesses 3 of the connecting ring, which leads to a locking of the pipe sockets 10, 100, 100; in the fashion of a bayonet closure. Due to the curvature of the projections 11 of the first pipe socket 10, a lowering of the first pipe socket 10 on the second pipe socket 100 simultaneously occurs given the rotation of the connecting ring 2 in the direction of the arrow B, so that the cleaning space 400 arises, as shown in FIG. 2, which is sealed off both from the atmosphere as well as from the region between the end faces 22, 122 in the cleaning position sealed by the closing flap seal 129. The cleaning space 400 can then be flooded with a cleaning gas or a cleaning fluid in order to remove residual contaminants before a refilling event without contaminating the sealed end face regions. After the cleaning, the drive shaft 301 is turned farther upon simultaneous, further locking and further lowering of the first pipe socket 10 relative to the second pipe socket 100, namely until the end faces 22, 122 of the closing flaps 21, 121 lie tightly against one another in the locked position.

A further rotation of the drive shaft 301 causes the plug 303 to disengage from the recess 305 and engages into the recess 315 of the disk 314, so that a further rotary motion in the direction of the arrow A is then transmitted onto the second output shaft 316. Given continued rotation of the drive shaft 301, a turning of the valves 20, 120 into the open position shown in FIG. 1 occurs, whereby the projections 27 at the first closing flap 21 simultaneously engage into the recesses 102 of the second pipe socket 100 and the projections 127 at the second closing flap 121 simultaneously engage into the recesses 12 of the first pipe socket. This leads to a locking of the valves 20, 120 to the pipe sockets 10, 100, 100' and makes it impossible to part the valves 20, 120 from one another in the open position. In the open position, a product (not shown) can flow from the first container into the second container through the flow-through openings 200, 200'

After the end of the product refilling, the drive shaft 301 can be rotated back into its initial position, i.e. opposite the rotational sense A in FIG. 2, whereby, via rotation of the second output shaft 316, the closing flaps 21, 121 are again turned into their respective pipe sockets 10, 100 up into the locked position for sealing the containers relative to one another. The plug 303 then again changes from the recess 315 into the recess 305 in order to turn the connecting ring 2 via the first output shaft 306 and into the cleaning position shown in FIG. 2, wherein a renewed cleaning of the cleaning space 400 is then possible. When the initial position of the drive shaft 301 is reached, finally the interlock is cancelled by releasing the connection between the projections 11 and the recesses 3, so that the two containers can then be separated from one another in turn.

In summary, it is therefore to be pointed out that the following stages can be successively run with the apparatus by actuating only the drive shaft 301:

1. Locking the pipe sockets 10, 100, 100' relative to one another given simultaneous sealing of the cleaning space 400;
2. Cleaning the sealed cleaning space 400 in the cleaning position;
3. Closing the cleaning space 400 until the locked position is reached;
4. Opening the flow-through openings 200, 200' given simultaneous locking of the closing flaps 21, 121 to the pipe sockets 10, 100;
5. Refilling a product from the first container into the second container;
6. Closing the flow-through openings 200, 200' while simultaneously releasing the lock between the closing flaps 21, 121 and the pipe sockets 10, 100;
7. Opening the cleaning space 400 in the partially locked cleaning position;
8. Cleaning the sealed cleaning space 400; and
9. Complete opening of the cleaning space 400 while simultaneously releasing the lock between the pipe sockets 10, 100, 100'.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

What is claimed is:

1. An apparatus for coupling first and second storage and/or transport units for transfer of a product from the first unit into a second unit, comprising:
    the first unit having a first closing flap in a first pipe socket at a first end;
    the second unit having a second closing flap in a second pipe socket at a second end;
    a swiveling device and a safety device which move the closing flaps from a closed position into a locked position, and into an open position;
    in the closed position, the first closing flap tightly closes the first unit off from the atmosphere at the first end and the second closing flap tightly closes the second unit off from the atmosphere at the second end, and at least one of the first and second closing flaps and the first and second pipe sockets are moveable relative to one another;
    in the locked position the first and second pipe sockets are firmly connected to one another;
    in the open position at least one of the first and second closing flaps and the first and second pipe sockets are firmly connected to one another where at least one flow-through opening for the product is open from the first unit into the second unit;
    a single actuation device via which the safety device is driven for changing from the closed position into a locked position where the first and second units are sealed relative to one another and the first and second pipe sockets are firmly joined to one another; and
    the swivel device being driven for moving into and subsequently moving out of the open position, and subsequently the safety device is driven for changing from the locked position into the closed position.

2. The apparatus according to claim 1 wherein the closing flaps are spaced from one another between the closed position and the locked position or between the open position and the locked position at least one of with closing flaps and pipe sockets at are at least partly firmly connected to one another in order to limit a cleaning space in a cleaning position that is closed both relative to atmosphere as well as to the product.

3. The apparatus according to claim 2 wherein the first closing flap comprises a first end face with at least one of a depression and elevation, the second closing flap comprises a second end face complementary with the first end face, and the two end faces lie tightly against one another at least in the open position, and in the cleaning position, the end faces are sealed relative to one another in a region of the at least one depression and elevation, and the cleaning space is essentially annular.

4. The apparatus according to claim 1 wherein the first closing flap comprises at least one first recess at its side lying opposite the first end face and the second closing flap comprises at least one second recess at its side lying opposite the second end face for enlarging the flow-through opening.

5. The apparatus according to claim 1 wherein the first closing flap is a component part of a passive valve and the second closing flap is a component part of an active valve.

6. The apparatus according to claim 2 wherein a cleaning device is provided via which a fluid cleaning agent is introduced into and removed from the closed cleaning space in the cleaning position.

7. An apparatus for coupling first and second storage and/or transport units for transfer of a product from the first unit into a second unit, comprising:
    the first unit having a first closing flap in a first pipe socket at a first end;
    the second unit having a second closing flap in a second pipe socket at a second end;
    a swiveling device and a safety device which move the closing flaps from a closed position into a locked position, and into an open position;
    in the closed position, the first closing flap tightly closes the first unit off from the atmosphere at the first end and the second closing flap tightly closes the second unit off from the atmosphere of the second end, and at least one of the first and second closing flaps and the first and second pipe sockets are movable relative to one another;
    in the locked position, at least one of the first and second closing flaps and the first and second pipe sockets are firmly connected to one another;
    in the open position at least one of the first and second closing flaps and the first and second pipe sockets are firmly connected to one another with at least one flow-through opening for the product is opened from the first unit into the second unit;
    an actuation device via which the safety device is driven for changing from the closed position into a locked position where the first and second units are sealed relative to one another and at least one of the first and second closing flaps and the first and second pipe sockets are firmly joined to one another;
    the swivel device being driven for moving into and subsequently moving out of the open position, and subsequently the safety device is driven for changing from the locked position into the closed position; and
    the actuation device comprises a gear device with a drive shaft and at least first and second output shafts, and where the first and second output shafts can be addressed by the drive shaft in alternating fashion.

8. The apparatus according to claim 7 wherein the safety device has an active connection with the first output shaft and with the two pipe sockets, the safety device comprising a connection element between the first pipe socket and the second pipe socket that is turned around a first axis for locking the two pipe sockets relative to one another or for unlocking them.

9. The apparatus according to claim 8 wherein the swivel device has an active connection with the second output shaft forming at least one shaft and with at least one of the two closing flaps for turning the closing flaps around a second axis, the swivel device comprising first and second semi-axes, the first semi-axis being firmly connected to the first closing flap and the second semi-axis being firmly connected to the second closing flap.

10. The apparatus according to claim 8 wherein the connecting element comprises at least one of a projection and recess is in firm engagement with at least one of a recess and a projection of at least one of the first pipe socket and of the second pipe socket in the locked position, at least one of each projection and recess of the at least one of connecting element and pipe socket describing an angle relative to the first axis by turning the connecting element around the first axis to move the closing flaps away from one another between the open position and the locked position or toward one another between the closed position and the locked position.

11. The apparatus according to claim 8, wherein in the open position, the first closing flap is at least partially in engagement with the second pipe socket and the second closing flap is at least partially in engagement with the first pipe socket.

12. The apparatus according to claim 11 wherein the first closing flap and the second closing flap comprise at least one partially annular projection concentric relative to the second axis for engagement into at least one partially annular recess in the first pipe socket and in the second pipe socket.

13. The apparatus according to claim 11 wherein the first closing flap and the second closing flap comprise at least one partially annular channel concentric relative to the second axis for engagement into at least one partially annular recess in the first pipe socket and in the second pipe socket.

14. The apparatus according to claim 9 wherein the second axis resides substantially perpendicular to the first axis.

15. An apparatus for coupling first and second units for transfer of a product from the first unit into a second unit, comprising:

the first unit having a first closing flap at a first pipe socket;

the second unit having a second closing flap at a second pipe socket;

a swiveling device and a safety device which move the closing flaps from a closed position into a locked position, and into an open position;

in the closed position, the first closing flap tightly closes the first unit off from the atmosphere and the second closing flap tightly closes the second unit off from the atmosphere, and at least one of the first and second closing flaps and the first and second pipe sockets are moveable relative to one another;

in the locked position the first and second pipe sockets are connected to one another;

in the open position, at least one of the first and second closing flaps and the first and second pipe sockets are connected to one another and at least one flow-through opening for the product is open from the first unit into the second unit;

a single actuation device via which the safety device is driven for changing from the closed position into the locked position where the first and second units are sealed relative to one another and the first and second pipe sockets are joined to one another; and the swivel device being drivable for moving into and subsequently moving out of the open position and the safety device being driveable for changing from the locked position into the closed position.

* * * * *